US00RE45909E

(19) United States
(12) Reissued Patent
Tsou et al.

(10) Patent Number: US RE45,909 E
(45) Date of Reissued Patent: *Mar. 1, 2016

(54) VIDEO DECODING APPARATUS, VIDEO DECODING METHOD, AND DIGITAL AUDIO/VIDEO PLAYBACK SYSTEM CAPABLE OF CONTROLLING PRESENTATION OF SUB-PICTURES

(71) Applicant: Novatek Microelectronics Corp., Hsinchu (TW)

(72) Inventors: Meng-Nan Tsou, Hsinchu (TW); Jung-fu Hsu, Hsinchu (TW)

(73) Assignee: Novatek Microelectronics Corp., Hsinchu (TW)

( * ) Notice: This patent is subject to a terminal disclaimer.

(21) Appl. No.: 13/689,769

(22) Filed: Nov. 30, 2012

Related U.S. Patent Documents

Reissue of:
(64) Patent No.: 7,844,168
Issued: Nov. 30, 2010
Appl. No.: 11/472,240
Filed: Jun. 20, 2006

(30) Foreign Application Priority Data

Jun. 30, 2005 (TW) ..... 94122087 A

(51) Int. Cl.
*H04N 5/85* (2006.01)
*G11B 27/10* (2006.01)
*H04N 5/44* (2011.01)

(52) U.S. Cl.
CPC ..... *G11B 27/10* (2013.01); *H04N 5/4401* (2013.01)

(58) Field of Classification Search
CPC ... H04N 5/45; H04N 7/0122; H04N 21/4316; H04N 21/440263; H04N 21/4884; G11B 27/10
USPC ..... 386/230, 232, 239, 244, 246; 348/563, 348/565, 445; 375/240.25
See application file for complete search history.

(56) References Cited

U.S. PATENT DOCUMENTS 4,998,171 A * 3/1991 Kim et al. ..... 348/565
5,467,142 A * 11/1995 Ichinokawa ..... 348/556
5,570,126 A * 10/1996 Blahut et al. ..... 725/93
5,912,710 A * 6/1999 Fujimoto ..... 348/445

(Continued)

FOREIGN PATENT DOCUMENTS

CN 1466849 1/2004
JP 402223286 A * 9/1990

(Continued)

*Primary Examiner* — Jalatee Worjloh
(74) *Attorney, Agent, or Firm* — Jianq Chyun IP Office

(57) ABSTRACT

A video decoding apparatus capable of controlling presentation of sub-pictures includes a first decoder, a second decoder, a first scaler, a second scaler and a combiner. The first decoder and the second decoder respectively decode a digital audio/video signal to generate a decoded video and a decoded sub-picture. In accordance with an output picture size, the decoded video size, the decoded sub-picture size and a sub-picture aspect ratio, the first scaler and the second scaler generate a first scaling factor and a second scaling factor. The combiner combines the decoded video and the decoded sub-picture according to the first scaling factor and the second scaling factor and outputs the combination thereof. A video decoding method and a digital audio/video playback system capable of controlling presentation of sub-pictures are also disclosed.

37 Claims, 5 Drawing Sheets

(56) References Cited

U.S. PATENT DOCUMENTS

| | | | | |
|---|---|---|---|---|
| 5,963,221 | A * | 10/1999 | Shimizu et al. | 345/539 |
| 6,147,712 | A * | 11/2000 | Shimamoto et al. | 348/446 |
| 6,204,887 | B1 * | 3/2001 | Hiroi | 348/565 |
| 6,310,656 | B1 * | 10/2001 | Miyazaki et al. | 348/568 |
| 6,678,006 | B1 * | 1/2004 | Velez et al. | 348/564 |
| 6,707,504 | B2 * | 3/2004 | Chung | 348/569 |
| 6,727,958 | B1 * | 4/2004 | Shyu | 348/581 |
| 6,775,467 | B1 * | 8/2004 | Su | 386/241 |
| 6,912,350 | B1 * | 6/2005 | Vasquez | 386/230 |
| 7,006,156 | B2 * | 2/2006 | Hirase et al. | 348/600 |
| 7,042,511 | B2 * | 5/2006 | Lin | 348/445 |
| 7,062,153 | B2 * | 6/2006 | Suda | 386/228 |
| 7,196,733 | B2 * | 3/2007 | Aratani et al. | 348/581 |
| 7,212,218 | B2 * | 5/2007 | Suzuki et al. | 345/660 |
| 7,365,757 | B1 * | 4/2008 | Callway et al. | 345/629 |
| 7,616,264 | B1 * | 11/2009 | Greenberg | 348/584 |
| 7,911,536 | B2 * | 3/2011 | Dunton | 348/556 |
| 7,936,360 | B2 * | 5/2011 | Kuno | 345/629 |
| 8,279,938 | B2 * | 10/2012 | Takahashi et al. | 375/240.25 |
| 2002/0034252 | A1 * | 3/2002 | Owen et al. | 375/240.17 |
| 2002/0089523 | A1 * | 7/2002 | Hodgkinson | 345/660 |
| 2003/0113102 | A1 * | 6/2003 | Lin | 386/95 |
| 2004/0179824 | A1 * | 9/2004 | Tsumagari et al. | 386/109 |
| 2004/0223745 | A1 * | 11/2004 | Sawabe et al. | 386/96 |
| 2005/0001931 | A1 * | 1/2005 | Kahn | 348/556 |
| 2005/0012862 | A1 * | 1/2005 | Lee | 348/588 |
| 2005/0068346 | A1 * | 3/2005 | Ogawa et al. | 345/699 |
| 2005/0128349 | A1 * | 6/2005 | Takamori et al. | 348/441 |
| 2005/0169608 | A1 * | 8/2005 | Shen et al. | 386/95 |
| 2006/0188229 | A1 * | 8/2006 | Yamagata et al. | 386/95 |
| 2007/0030392 | A1 * | 2/2007 | Mizosoe et al. | 348/565 |
| 2007/0097261 | A1 * | 5/2007 | Smith et al. | 348/445 |

FOREIGN PATENT DOCUMENTS

| | | | |
|---|---|---|---|
| JP | 09-294250 | * | 11/1997 |
| JP | 10-215409 | * | 8/1998 |
| JP | 2002-016884 | * | 1/2002 |
| JP | 2003-037792 | * | 2/2003 |
| JP | 2004-208014 | * | 7/2004 |
| JP | 2004-320324 | * | 11/2004 |
| WO | WO 2004/051992 | * | 6/2004 |
| WO | 2004057532 | | 7/2004 |

* cited by examiner

VIDEO DECODING APPARATUS, VIDEO DECODING METHOD, AND DIGITAL AUDIO/VIDEO PLAYBACK SYSTEM CAPABLE OF CONTROLLING PRESENTATION OF SUB-PICTURES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION a) Field of the Invention

The invention relates to a video decoding apparatus, a video decoding method and a digital audio/video playback system and, more particularly, to a video decoding apparatus, a video decoding method and a digital audio/video playback system capable of controlling presentation of sub-pictures.

b) Description of the Related Art

Due to the advance of information technology, both audio and video data can be stored, transmitted and played back in digital format. Besides providing movies of better quality, audio and video data in digital format offers many additional functions. Take the digital versatile disc (DVD) for instance, not only can the DVD store high-quality movies, but the DVD can also store multilingual audio tracks and multiple sub-pictures for users to choose from during playback. One of the major functions of sub-pictures is to act as subtitles, for example, an English film can include therein English and Chinese audio tracks, and English and Chinese subtitles, and during playback, users can choose the English audio track with Chinese subtitle, or the English audio track with English subtitle, as well as the Chinese audio track with English or Chinese subtitles. Therefore, this function facilitates internationalization of films.

As common practice, even though the DVD contains multiple subtitles, the DVD is usually played back with only one subtitle displayed. If two or more subtitles are displayed simultaneously, there can be overlay among the subtitles, making them difficult to read, or only one of the subtitles is displayed in the overlaid region such that other subtitles cannot be completely displayed.

Furthermore, differently formatted DVD films can cause incomplete display of the subtitle during playback. For example, in Phase Alternate Line (PAL) standard adopted by most European countries and Australia, the resolution of the DVD film is 720×576 pixels. In National Television System Committee (NTSC) standard adopted by North America and Japan, the resolution of the DVD film is 720×480 pixels. Therefore, when a DVD film recorded according to PAL standard is played back in a playback system compliant with NTSC standard, there is a possibility that the subtitle at the lower end of the picture is cut off and cannot be displayed completely. In addition, similar problems exist when playback systems with different formats, namely 4:3 or 16:9, are used to play differently formatted DVD films.

In summary, it would be desirable if the sub-pictures can be completely displayed and overlay among multiple sub-pictures can be avoided during playback of a digital film.

SUMMARY OF THE INVENTION

In view of the problems mentioned above, an object of the invention is to provide a video decoding apparatus, a video decoding method and a digital audio/video system capable of controlling presentation of sub-pictures, and the apparatus, method and system are able to control the aspect ratio and the position of the sub-pictures so that the sub-pictures can be completely displayed and any overlay among multiple sub-pictures is avoided.

To achieve the object mentioned above, the digital audio/video playback system capable of controlling presentation of sub-pictures of the invention decodes a digital audio/video signal, and to playback an output picture and a decoded audio through a video output device and an audio output device. The digital audio/video playback system includes a signal loader, a signal parser, a video decoding apparatus and an audio decoder. The signal loader is utilized to receive the digital audio/video signal. The signal parser is utilized to divide the digital audio/video signal into a video bit stream, a sub-picture bit stream and an audio bit stream. The audio decoder receives the audio bit stream, decodes it to a decoded audio, and outputs the decoded audio to the audio output device. The video decoding apparatus receives the video bit stream and the sub-picture bit stream, decodes and combines them into a picture, and outputs the combined picture to the video output device to playback.

The abovementioned video decoding apparatus includes: a first decoder which receives the video bit stream and decodes it in order to generate a decoded video; a second decoder which receives the sub-picture bit stream and decodes it in order to generate at least one decoded sub-picture; a first scaler which captures the size of the decoded video and generates a first scaling factor according to the size of the output picture and the size of the decoded video; a second scaler which captures the size and the position of the decoded sub-picture and generates a second scaling factor according to the size of the output picture, the size of the decoded sub-picture and a sub-picture aspect ratio; and a combiner which sets the size of the decoded video according to the first scaling factor, sets the size and the position of the decoded sub-picture according to the second scaling factor, combines the decoded video and the decoded sub-picture, and outputs the combined picture to the video output device.

The invention also discloses a video decoding method capable of controlling presentation of sub-pictures, which is utilized to decode a digital audio/video signal and to playback an output picture through a video output device. The video decoding method includes: receiving a video bit stream and decoding it to generate a decoded video; receiving a sub-picture bit stream and decoding it to generate at least one decoded sub-picture; capturing the size of the decoded video and generating a first scaling factor according to the size of the output picture and the size of the decoded video; capturing the size and the position of the decoded sub-picture, and generating a second scaling factor according to the size of the output picture, the size of the decoded sub-picture and a sub-picture aspect ratio; and setting the size of the decoded video according to the first scaling factor, setting the size and the position of the decoded sub-picture according to the second scaling factor, combining the decoded video and the decoded sub-picture, and outputting the combined picture to the video output device.

The video decoding apparatus, method and the digital audio/video playback system capable of controlling presentation of sub-pictures according to the invention are able to control the aspect ratio and the position of sub-pictures in order to completely display sub-pictures. At the same time, when a single sub-picture or a plurality of sub-pictures are displayed, there is no overlay on the main video region and overlay among the sub-pictures is avoided effectively so that each of the sub-pictures is completely displayed.

DETAIL DESCRIPTION OF THE INVENTION

The video decoding apparatus, video decoding method and digital audio/video playback system capable of controlling presentation of sub-pictures according to preferred embodiments of the invention will be explained below with reference to the drawings, wherein the like numerals denote the like components.

Figure 1:
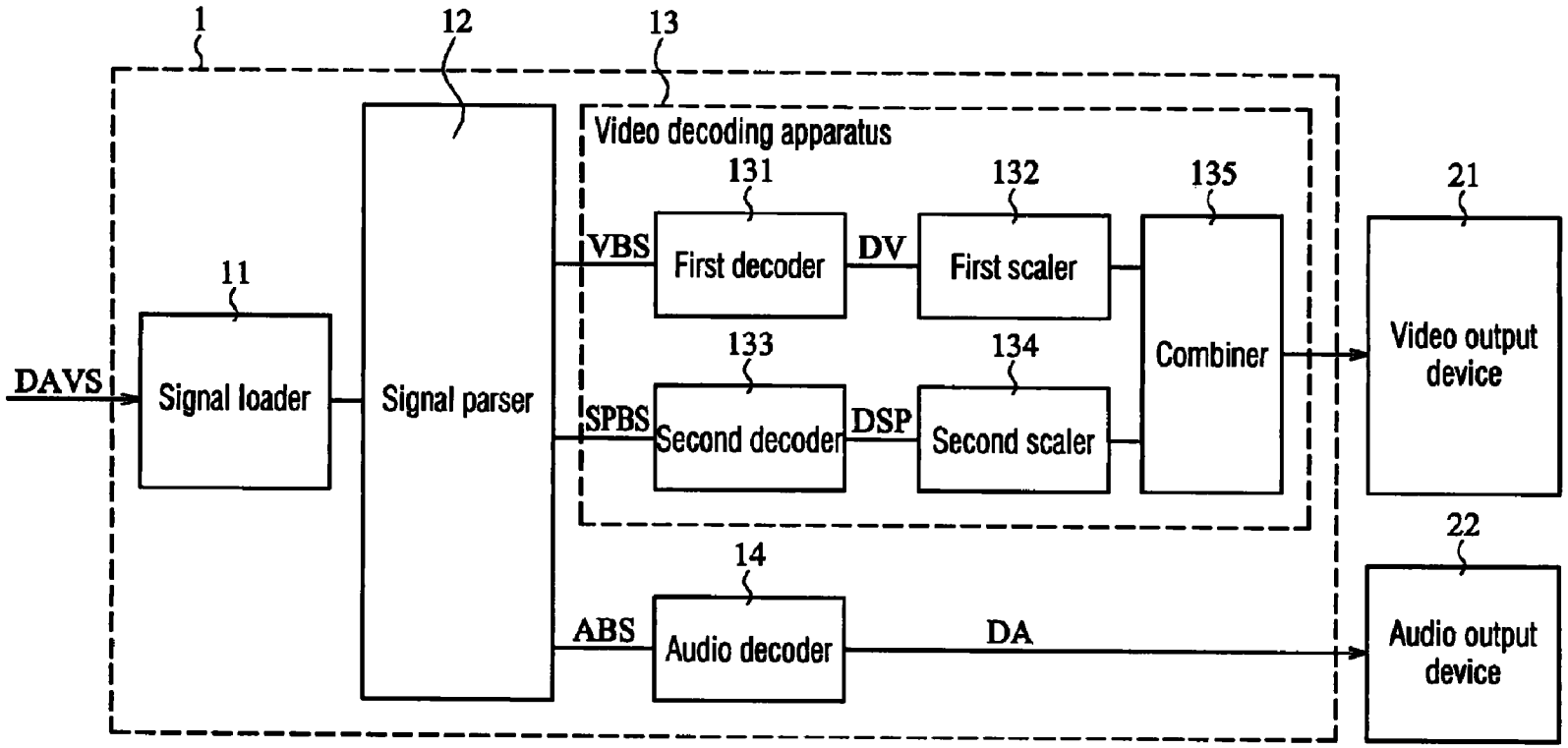
FIG. 1 shows a block diagram of a digital audio/video playback system capable of controlling presentation of sub-pictures according to a preferred embodiment of the invention.

Referring to FIG. 1, a digital audio/video playback system 1 capable of controlling presentation of sub-pictures according to a preferred embodiment of the invention is utilized to decode a digital audio/video signal (DAVS) and to playback an output picture and a decoded audio through a video output device 21 and an audio output device 22, wherein the DAVS includes a video bit stream (VBS), a sub-picture bit stream (SPBS) and an audio bit stream (ABS). The digital audio/video playback system 1 includes a signal loader 11, a signal parser 12, a video decoding apparatus 13 and an audio decoder 14.

The signal loader 11 is utilized to receive DAVS. Take a DVD player for instance, the signal loader 11 may include elements like a control unit, a loading unit, a signal processing unit and more. As for Digital Video Broadcasting (DVB), the signal loader 11 may include elements like a control unit, an antenna, a signal processing unit and more. Therefore, in correspondence to different requirements, the signal loader 11 can be realized through different designs by a person skilled in the art, and thus the signal loader 11 is not explained in further detail.

The signal parser 12 is utilized to divide the loaded DAVS into a VBS, a SPBS and an ABS. The audio decoder 14 is utilized to receive the ABS and to decode it into a decoded audio (DA) for the audio output device to playback.

The video decoding apparatus 13 is utilized to receive and decode the VBS and the SPBS, and then the video decoding apparatus 13 combines the two into a picture for the video output device 21 to playback. The video decoding apparatus 13 includes: a first decoder 131, a second decoder 133, a first scaler 132, a second scaler 134 and a combiner 135. The first decoder 131 receives the VBS, decodes the VBS and outputs a decoded video (DV). The second decoder 133 receives the SPBS, decodes the SPBS and outputs at least one decoded sub-picture (DSP) under the control of the user's choice; for example, the second decoder 133 can output one or a plurality of DSPs. The first decoder can be an MPEG decoder, while the second decoder can be a run-length decoder.

The first scaler 132 is utilized to capture the size of the DV, such as the horizontal width and the vertical height, and to generate a first scaling factor according to the size of the output picture and the size of the DV. The second scaler 134 is utilized to capture the size and the position of the DSP, such as the horizontal coordinate and the vertical coordinate, and to generate a second scaling factor according to the size of the output picture, the size of the DSP and a sub-picture aspect ratio. The combiner 135 sets the size of the DV according to the first scaling factor, sets the size and the position of the DSP according to the second scaling factor, combines the DV and the DSP, and outputs the combined picture to the video output device 21 to playback. The procedures for generating the first scaling factor and the second scaling factor, and for combining the DV and the DSP will be described later.

Figure 2:
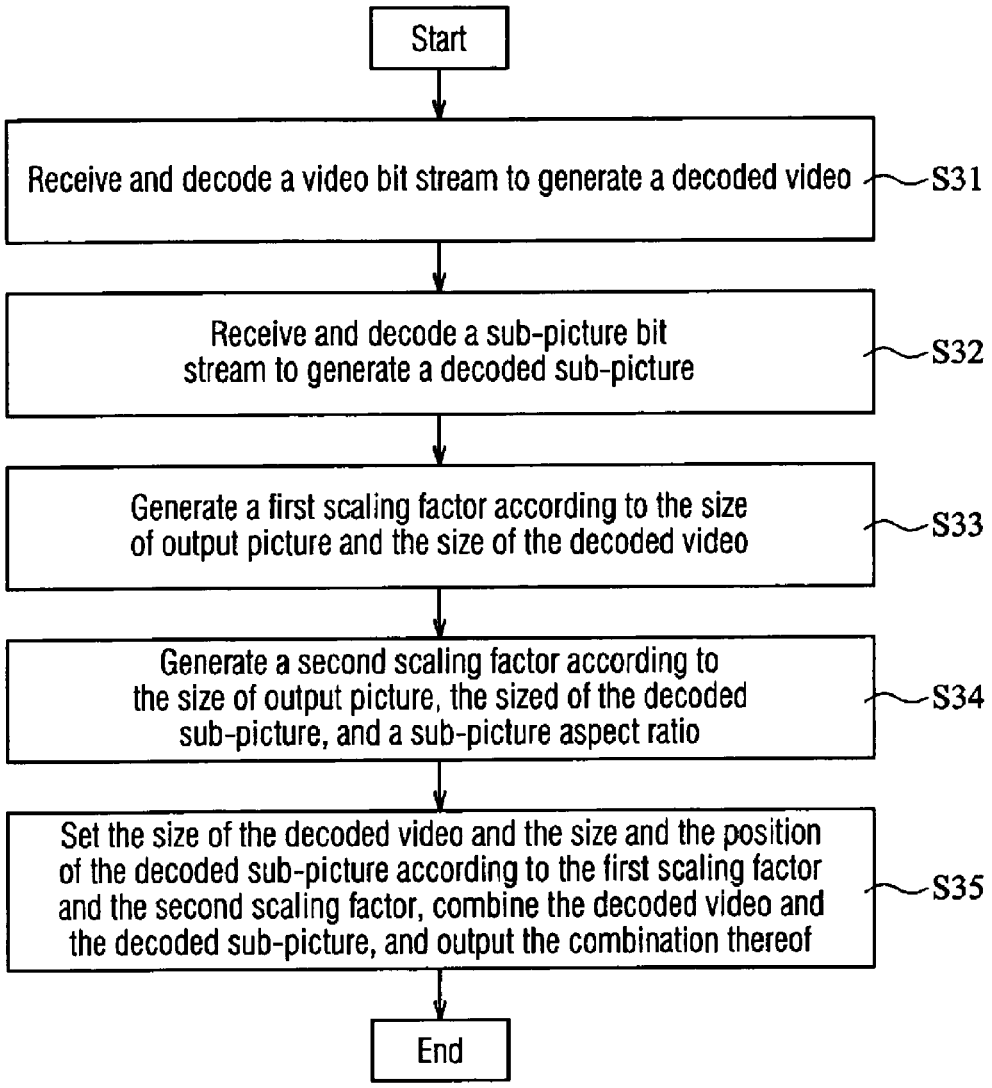
FIG. 2 shows a video decoding method capable of controlling presentation of sub-pictures according to a preferred embodiment of the invention.

Referring to FIG. 2, a video decoding method capable of controlling presentation of sub-pictures according to a preferred embodiment of the invention is described. First, a VBS is received and decoded to generate a DV (S31), and then a SPBS is received and decoded to generate at least one DSP (S32). Next, the size of the DV is captured, and a first scaling factor is generated according to the size of an output picture and the size of the DV (S33).

Figure 3:
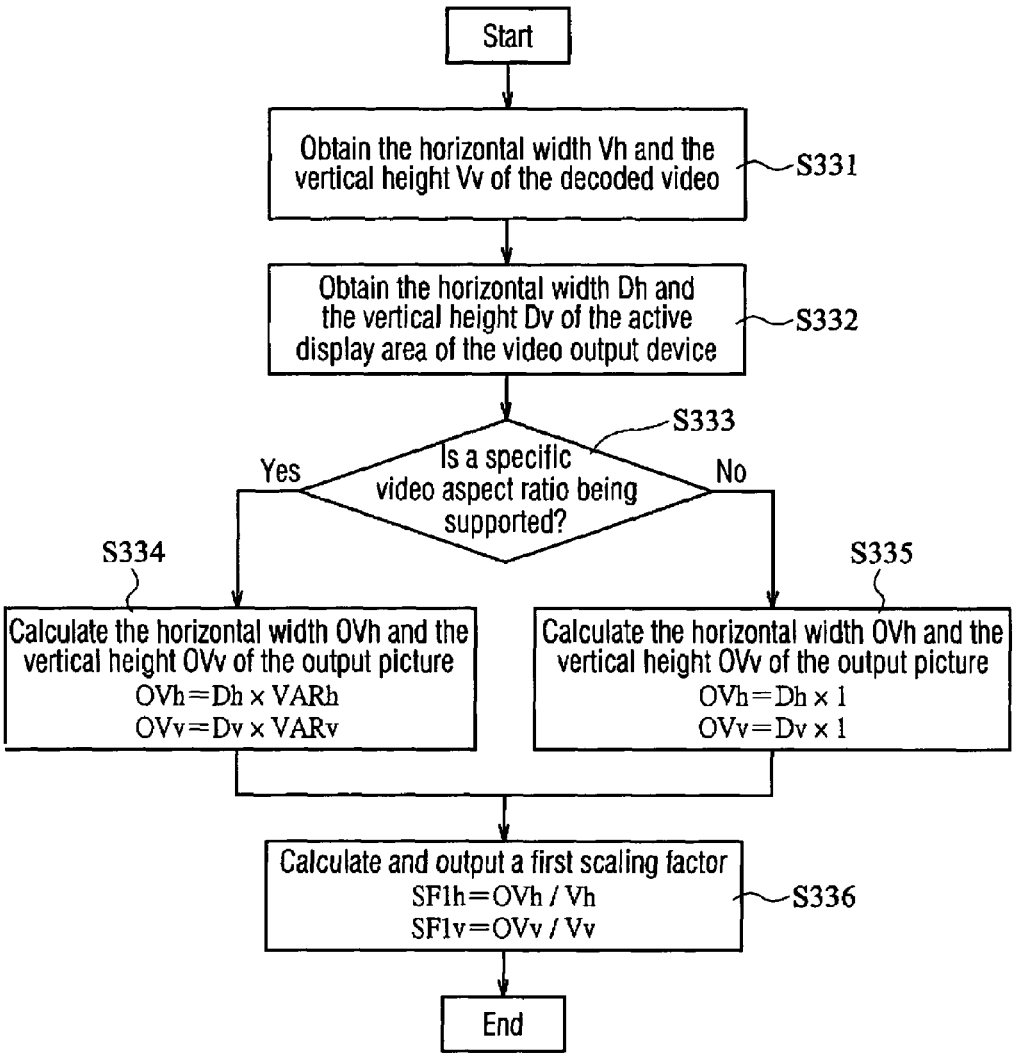
FIG. 3 shows a flow chart of a first scaler generating a first scaling factor.

Referring to FIG. 3, the procedure for generating the first scaling factor is described. First, the size of the DV, namely its horizontal width Vh and its vertical height Vv, is obtained (S331), and the size of the active display area of a video output device 21, namely its horizontal width Dh and its vertical height Dv, is obtained (S332). The next step is to determine whether or not a film to be played supports specific video aspect ratios (S333), for example the aspect ratios of modes such as letterbox or pan & scan. If the film to be played does not support a specific display mode, the size of the output picture is equal to the size of the active display area of the video output device 21, namely the horizontal width OVh of the output picture is equal to the horizontal width Dh of the active display area of the video output device 21, and the vertical height OVv of the output picture is equal to the vertical height Dv of the active display of the video output device 21 (S335). If the film to be played supports a specific display mode, and the user chooses the specific display mode for playback, the horizontal width OVh of the output picture is the product of the horizontal width Dh of the active display area of the video output device 21 and a horizontal [aspect] ratio VARh of the video aspect ratio, and the vertical height OVv of the output picture is the product of the vertical height Dv of the active display area of the video output device 21 and a vertical [aspect] ratio VARv of the video aspect ratio (S334). Finally, the first scaling factor is calculated according to the size of the output picture and the size of the DV, and the first scaling factor includes a first horizontal scaling factor (SF1h) and a first vertical scaling factor (SF1v). The SF1h is equal to the horizontal width OVh of the output picture divided by the horizontal width Vh of the DV. The SF1v is equal to the vertical height OVv of the output picture divided by the vertical height Vv of the DV.

Referring to FIG. 2 again, the step S34 is to capture the size and the position of the DSP, and to generate a second scaling factor according to the size of the output picture, the size of the DSP and a sub-picture aspect ratio.

Figure 4:
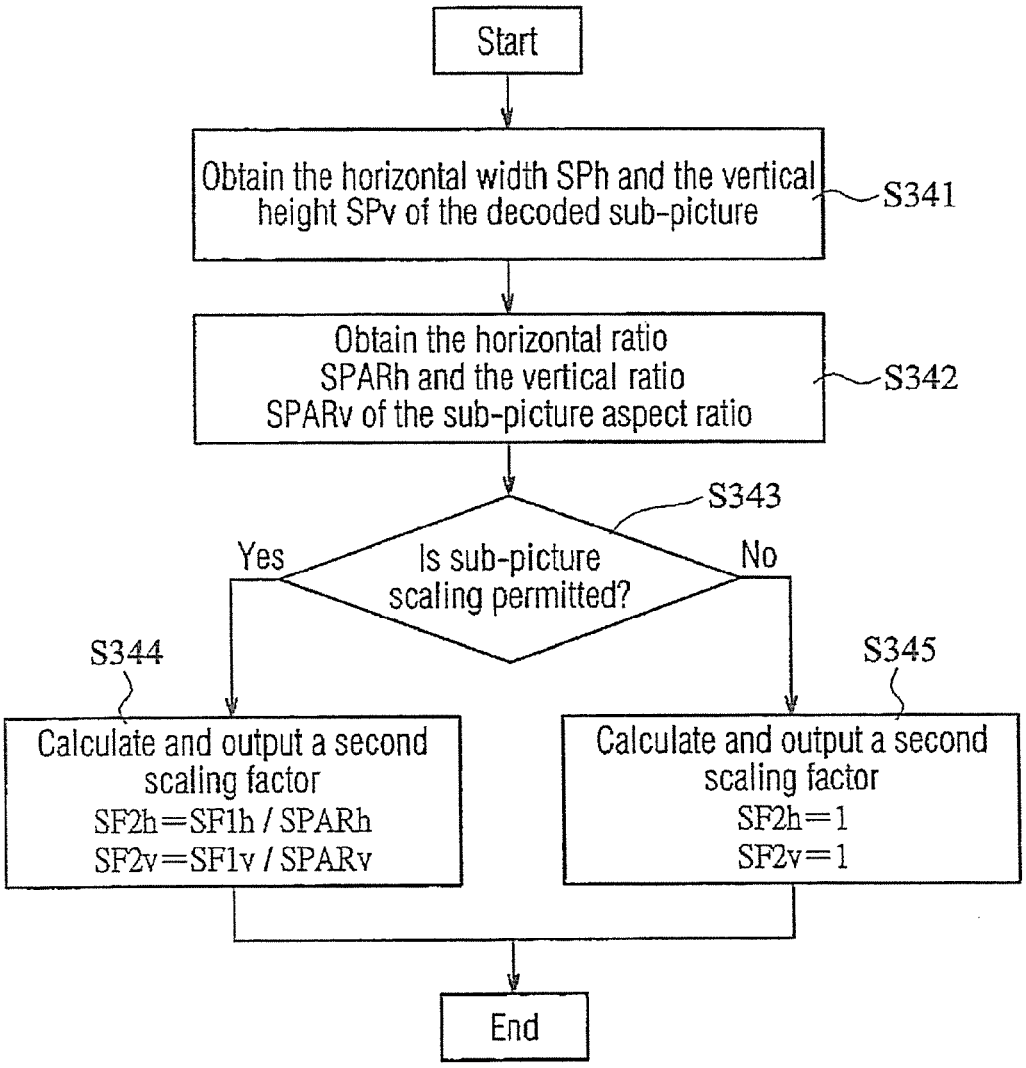
FIG. 4 shows a flow chart of a second scaler generating a second scaling factor.

Referring to FIG. 4, the procedure for generating the second scaling factor is described. First, the size and the position of the DSP, namely its horizontal width SPh, its vertical height SPv, its horizontal coordinate, and its vertical coordinate, are obtained (S341). Then, the sub-picture aspect ratio of the DSP, which includes a horizontal [aspect] ratio (SPARh) and a vertical [aspect] ratio (SPARv), is obtained (S342). The next step is to determine whether the film to be played permits sub-picture scaling (S343); scaling the sub-picture can result in a blurred sub-picture during playback, thus restriction on sub-picture scaling may have been added when the film was recorded. If sub-picture scaling is prohibited, a second horizontal scaling factor (SF2h) and a second vertical scaling factor (SF2v) of the second scaling factor are both 1 (S345), namely the sub-picture is not scaled. If the sub-picture scaling is allowed for playback, the SF2h is equal to the SF1h divided by the SPARh of the sub-picture aspect ratio, and the SF2v is equal to the SF1v divided by the SPARv of the sub-picture aspect ratio.

Referring to FIG. 2 again, finally, the size of the DV is set according to the first scaling factor, the size and the position of the DSP is set according to the second scaling factor, the DV and the DSP are combined, and the combined picture is output to the video output device 21 to playback (S35).

Figure 5:
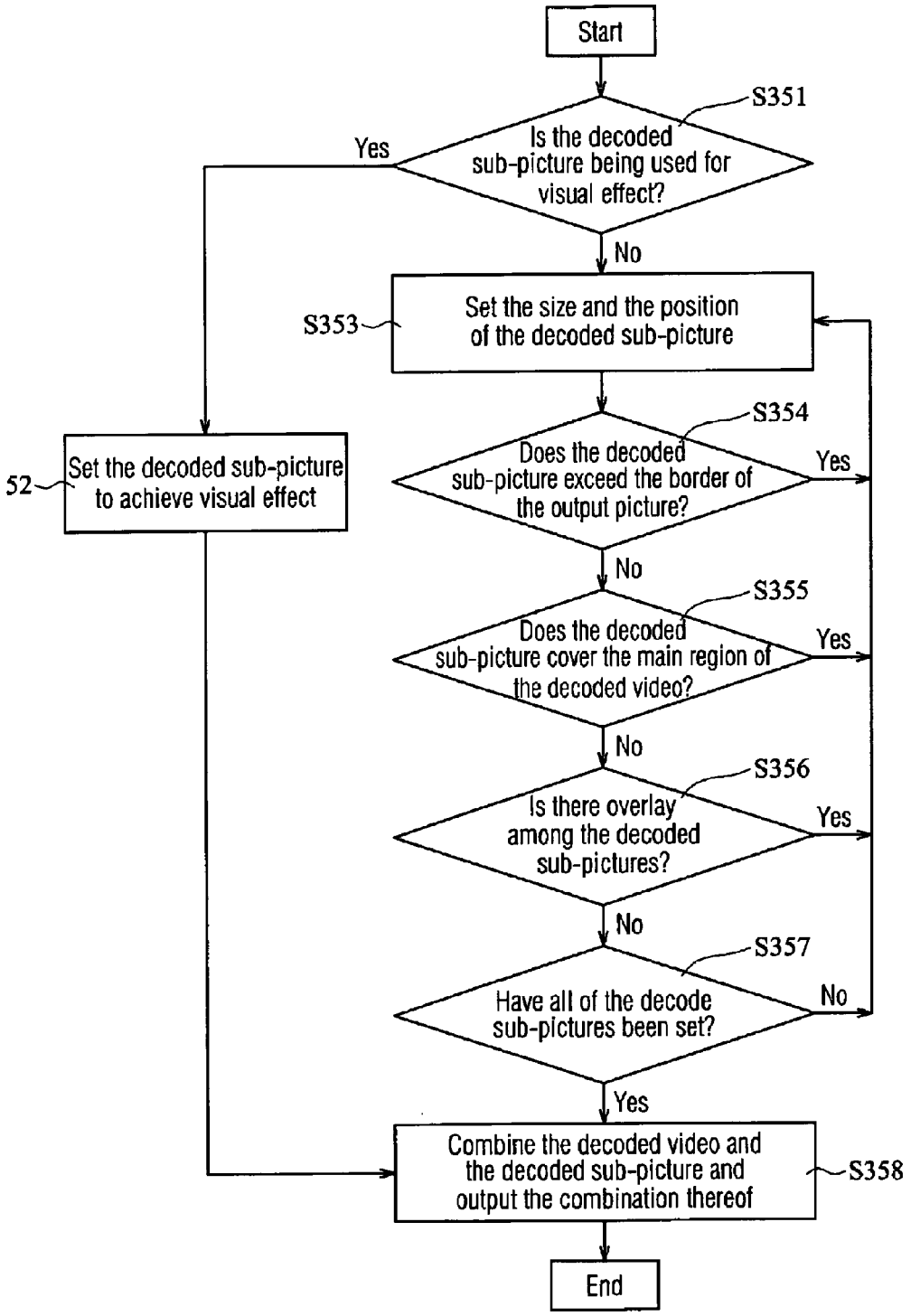
FIG. 5 shows a flow chart of a combiner combining the decoded video and the decoded sub-picture.

The flow of combining the DV and the DSP is depicted in FIG. 5. Firstly, determine whether the DSP is for the purpose of visual effect instead of being as the sub-title (S351). If yes, the relative positions between the DSP and the DV should be fixed to retain the intended visual effect, thus, the size of the DSP is set so as to precisely achieve the purpose of visual effect. If the DSP is for the purpose other than visual effect, for example as the sub-title, the size and the position of the DSP are set (S353). Next, whether the DSP exceeds the border of the picture is determined (S354); if yes, the size and the position of the DSP are re-set (S353). Then, whether the DSP covers the main region of the DV is determined (S355). For example, generally the central area of a DV is the main region, thus efforts should be made to prevent DSP from covering the central area of the DV as much as possible. If the main region of the DV is covered, the size and the position of the DSP are re-set as well (S353). If the user chooses to display a plurality of DSPs, it is necessary to further determine whether there is overlay among the plurality of DSPs (S356) when combining the DV and the DSPs. And if there is overlay among the plurality of DSPs, go back to step S353 to re-set the sizes and the positions of the plurality of DSPs. After the sizes and the positions of all the DSPs are set (S357), combine the DV and the DSP, and output the combined picture to the video output device 21 for playback (S358).

Regardless of what the modes the film to be displayed supports and what standards the display system complies with, the video decoding apparatus, video decoding method and digital audio/video system capable of controlling the presentation of the sub-pictures according to the invention are able to control the aspect ratio and the position of the sub-pictures so as to completely display the sub-pictures. Additionally, when a single sub-picture is displayed, the main video region is not covered, and when a plurality of sub-pictures are displayed, overlay among the plurality of sub-pictures is avoided to completely display all the sub-pictures.

While the invention has been described by way of example and in terms of the preferred embodiment, it is to be understood that the invention is not limited to the disclosed embodiments. To the contrary, it is intended to cover various modifications and similar arrangements apparent to those skilled in the art. For example, in the DVB system, the size and the coordinates of each object can be captured, and the size and the position of each object can be properly set for it to function properly. Therefore, the scope of the appended claims should be accorded the broadest interpretation so as to encompass all such modifications and similar arrangements.

What is claimed is:

1. A video decoding apparatus capable of controlling presentation of sub-pictures, which is for decoding a digital audio/video signal and outputting an output picture through a video output device, wherein the digital audio/video signal includes a video bit stream and a sub-picture bit stream, the video decoding apparatus comprising:

a first decoder which receives the video bit stream and decodes the video bit stream to generate a decoded video;

a second decoder which receives the sub-picture bit stream and decodes the sub-picture bit stream to generate at least one decoded sub-picture;

a first scaler which captures the size of the decoded video and generates a first scaling factor according to the size of the output picture and the size of the decoded video;

a second scaler which captures the size and the position of the decoded sub-picture and generates a second scaling factor according to the size of the output picture, the size of the decoded sub-picture, and a sub-picture aspect ratio; and a combiner which sets the size of the decoded video according to the first scaling factor, sets the size and the position of the decoded sub-picture according to the second scaling factor, combines the decoded video and the decoded sub-picture, and outputs the combined picture to the video output device.

2. The video decoding apparatus as specified in claim 1, wherein:

the first scaling factor comprises a first horizontal scaling factor and a first vertical scaling factor, in which the first horizontal scaling factor is equal to the horizontal width of the output picture divided by the horizontal width of the decoded video, and the first vertical scaling factor is equal to the vertical height of the output picture divided by the vertical height of the decoded video; and the second scaling factor comprises a second horizontal scaling factor and a second vertical scaling factor while the sub-picture aspect ratio includes a horizontal [aspect] ratio and a vertical [aspect] ratio, in which the second horizontal scaling factor is equal to the first horizontal scaling factor divided by the horizontal [aspect] ratio of the sub-picture aspect ratio, and the second scaling factor is equal to the first vertical scaling factor divided by the vertical [aspect] ratio of the sub-picture aspect ratio.

3. The video decoding apparatus as specified in claim 2, wherein the horizontal width of the output picture is the product of the horizontal width of the active display area of the video output device and a horizontal [aspect] ratio of a video aspect ratio, and the vertical height of the output picture is the product of the vertical height of the active display of the video output device and a vertical [aspect] ratio of the video aspect ratio.

4. The video decoding apparatus as specified in claim 1, wherein if the decoded sub-picture is for the purpose of visual effect, the combiner only sets the size of the decoded video and the size of the decoded sub-picture when combining the decoded video and the decoded sub-picture.

5. The video decoding apparatus as specified in claim 1, wherein when the decoding of the sub-picture bit stream generates a plurality of decoded sub-pictures, the combiner further sets the positions of the plurality of decoded sub-pictures so as to avoid overlay among the plurality of decoded sub-pictures.

6. The video decoding apparatus as specified in claim 1, wherein the first decoder is an MPEG decoder and the second decoder is a run-length decoder.

7. A digital audio/video playback system capable of controlling presentation of sub-pictures, which is for decoding a digital audio/video signal, outputting an output picture through a video output device, and outputting a decoded audio through an audio output device, the digital audio/video playback system comprising:

a signal loader which receives the digital audio/video signal;

a signal parser which divides the digital audio/video signal into a video bit stream, a sub-picture bit stream, and an audio bit stream;

an audio decoder which receives the audio bit stream, decodes the audio bit stream to a decoded audio, and outputs the decoded audio to the audio output device; and a video decoding apparatus, including:

a first decoder which receives the video bit stream and decodes the video bit stream to generate a decoded video;

a second decoder which receives the sub-picture bit stream and decodes the sub-picture bit stream to generate at least one decoded sub-picture;

a first scaler which captures the size of the decoded video and generates a first scaling factor according to the size of the output picture and the size of the decoded video;

a second scaler which captures the size and the position of the decoded sub-picture and generates a second scaling factor according to the size of the output picture, the size of the decoded sub-picture, and a sub-picture aspect ratio; and a combiner which sets the size of the decoded video according to the first scaling factor, sets the size and the position of the sub-picture according the second scaling factor, combines the decoded video and the decoded sub-picture, and outputs the combined picture to the video output device.

8. The digital audio/video playback system as specified in claim 7, wherein:

the first scaling factor comprises a first horizontal scaling factor and a first vertical scaling factor, in which the first horizontal scaling factor is equal to the horizontal width of the output picture divided by the horizontal width of the decoded video, the first vertical scaling factor is equal to the vertical height of the output picture divided by the vertical height of the decoded video; and the second scaling factor comprises a second horizontal scaling factor and a second vertical scaling factor while the sub-picture aspect ratio includes a horizontal [aspect] ratio and a vertical [aspect] ratio, in which the second horizontal scaling factor is equal to the first horizontal scaling factor divided by the vertical [aspect] ratio of the sub-picture aspect ratio, and the second vertical scaling factor is equal to the first vertical scaling factor divided by the vertical [aspect] ratio of the sub-picture aspect ratio.

9. The digital audio/video playback system as specified in claim 8, wherein the horizontal width of the output picture is the product of the horizontal width of the active display area of the video output device and a horizontal [aspect] ratio of a video aspect ratio, and the vertical height of the output picture is the product of the height of the active display area of the video output device and a vertical [aspect] ratio of the video aspect ratio.

10. The digital audio/video playback system as specified in claim 7, wherein if the decoded sub-picture is for the purpose of visual effect, the combiner only sets the size of the decoded video and the size of the decoded sub-picture when combining the decoded video and the decoded sub-picture.

11. The digital audio/video playback system as specified in claim 7, wherein when the decoding of the sub-picture bit stream generates a plurality of decoded sub-pictures, the combiner further sets the positions of the plurality of decoded sub-pictures so as to avoid overlay among the plurality of decoded sub-pictures.

12. The digital audio/video playback system as specified in claim 7, wherein the first decoder is an MPEG decoder, and the second decoder is a run-length decoder.

13. The digital audio/video playback system as specified in claim 7, wherein the digital audio/video playback system is a DVD playback system or a digital video broadcasting playback system.

14. A video decoding method capable of controlling presentation of sub-pictures, which is for decoding a digital audio/video signal, outputting an output picture through a video output device, wherein the digital audio/video signal includes a video bit stream and a sub-picture bit stream, the video decoding method comprising the steps of:

receiving the video bit stream and decoding the video bit stream to generate a decoded video;

receiving the sub-picture bit stream and decoding the sub-picture bit stream to generate at least one decoded sub-picture;

capturing the size of the decoded video, and generating a first scaling factor according to the size of the output picture and the size of the decoded video;

capturing the size and the position of the decoded sub-picture, and generating a second scaling factor according to the size of the output picture, the size of the decoded sub-picture and a sub-picture aspect ratio; and setting the size of the decoded video according to the first scaling factor, setting the size and the position of the decoded sub-picture according to the second scaling factor, combining the decoded video and the decoded sub-picture, and outputting the combined picture to the video output device.

15. The video decoding method as specified in claim 14, wherein:

the first scaling factor comprises a first horizontal scaling factor and a first vertical scaling factor, in which the first horizontal scaling factor is equal to the horizontal width of the output picture divided by the horizontal width of the decoded video, and the first vertical scaling factor is equal to the vertical height of the output picture divided by the vertical height of the decoded video; and the second scaling factor comprises a second horizontal scaling factor and a second vertical scaling factor while the sub-picture aspect ratio includes a horizontal [aspect] ratio and a vertical [aspect] ratio, in which the second horizontal scaling factor is equal to the first horizontal scaling factor divided by the horizontal [aspect] ratio of the sub-picture aspect ratio, and the second scaling factor is equal to the first vertical scaling factor divided by the vertical [aspect] ratio of the sub-picture aspect ratio.

16. The video decoding method as specified in claim 15, wherein the horizontal width of the output picture is the product of the horizontal width of the active display area of the video output device and a horizontal [aspect] ratio of a video aspect ratio, and the vertical height of the output picture is the product of the vertical height of the active display of the video output device and a vertical [aspect] ratio of the video [aspect] ratio.

17. The video decoding method as specified in claim 14, wherein if the decoded sub-picture is for the purpose of visual effect, only the size of the decoded video and the size of the decoded sub-picture are set when combining the decoded video and the decoded sub-picture.

18. The video decoding method as specified in claim 14, wherein the decoded sub-picture is prevented from exceeding the border of the output picture and covering the main region of the decoded video when combining the decoded video and the decoded sub-picture.

19. A video decoding method as specified in claim 14, wherein when the decoding of the sub-picture bit stream generates a plurality of decoded sub-pictures, overlay among the plurality of decoded sub-pictures is prevented when combining the decoded video and the decoded sub-pictures.

20. The video decoding method as specified in claim 14, wherein the first decoder is an MPEG decoder, and the second decoder is a run-length decoder.

*21. A video decoding apparatus capable of controlling presentation of sub-pictures, which is for decoding a digital audio/video signal and outputting an output picture through a video output device, wherein the digital audio/video signal includes a video bit stream and a sub-picture bit stream, the video decoding apparatus comprising:*

*a first decoder which receives the video bit stream and decodes the video bit stream to generate a decoded video;*

*a second decoder which receives the sub-picture bit stream and decodes the sub-picture bit stream to generate a decoded sub-picture;*

*a first scaler which generates a first scaling factor according to the size of the output picture and the size of the decoded video;*

*a second scaler which generates a second scaling factor according to a ratio of the first scaling factor and a sub-picture aspect ratio; and*

*a combiner which sets a displayed size of the decoded video according to the first scaling factor, sets a displayed size and a position of the decoded sub-picture according to the second scaling factor, combines the decoded video and the decoded sub-picture, and outputs the combined picture to the video output device.*

*22. The video decoding apparatus as specified in claim 21, wherein:*

*the first scaling factor comprises a first horizontal scaling factor and a first vertical scaling factor, in which the first horizontal scaling factor is equal to the horizontal width of the output picture divided by the horizontal width of the decoded video, and the first vertical scaling factor is equal to the vertical height of the output picture divided by the vertical height of the decoded video.*

*23. The video decoding apparatus as specified in claim 22, wherein the second scaling factor comprises a second horizontal scaling factor and a second vertical scaling factor while the sub-picture aspect ratio includes a horizontal ratio and a vertical ratio, in which the second horizontal scaling factor is equal to the first horizontal scaling factor divided by the horizontal ratio of the sub-picture aspect ratio, and the second vertical scaling factor is equal to the first vertical scaling factor divided by the vertical ratio of the sub-picture aspect ratio.*

*24. The video decoding apparatus as specified in claim 22, wherein the horizontal width of the output picture is the product of the horizontal width of the active display area of the video output device and a horizontal ratio of a video aspect ratio, and the vertical height of the output picture is the product of the vertical height of the active display area of the video output device and a vertical ratio of the video aspect ratio.*

*25. The video decoding apparatus as specified in claim 21, wherein if the decoded sub-picture is for the purpose of visual effect, the combiner sets the displayed size of the decoded sub-picture according to the first scaling factor when combining the decoded video and the decoded sub-picture.*

*26. The video decoding apparatus as specified in claim 21, wherein when the decoding of the sub-picture bit stream generates a plurality of decoded sub-pictures, the combiner further sets the positions of the plurality of decoded sub-pictures so as to avoid overlay among the plurality of decoded sub-pictures.*

*27. A digital audio/video playback system capable of controlling presentation of sub-pictures, which is for decoding a digital audio/video signal, outputting an output picture through a video output device, and outputting a decoded audio through an audio output device, the digital audio/video playback system comprising:*

*a signal loader which receives the digital audio/video signal;*

*a signal parser which divides the digital audio/video signal into a video bit stream, a sub-picture bit stream, and an audio bit stream;*

*an audio decoder which receives the audio bit stream, decodes the audio bit stream to a decoded audio, and outputs the decoded audio to the audio output device; and*

*a video decoding apparatus of claim 21.*

*28. A video decoding method capable of controlling presentation of sub-pictures, which is for decoding a digital audio/video signal, outputting an output picture through a video output device, wherein the digital audio/video signal includes a video bit stream and a sub-picture bit stream, the video decoding method comprising the steps of:*

*receiving the video bit stream and decoding the video bit stream to generate a decoded video;*

*receiving the sub-picture bit stream and decoding the sub-picture bit stream to generate a decoded sub-picture;*

*generating a first scaling factor according to the size of the output picture and the size of the decoded video;*

*generating a second scaling factor according to a ratio of the first scaling factor and a sub-picture aspect ratio; and*

*setting a displayed size of the decoded video according to the first scaling factor, setting a displayed size and a position of the decoded sub-picture according to the second scaling factor, combining the decoded video and the decoded sub-picture, and outputting the combined picture to the video output device.*

*29. The video decoding method as specified in claim 28, wherein:*

*the first scaling factor comprises a first horizontal scaling factor and a first vertical scaling factor, in which the first horizontal scaling factor is equal to the horizontal width of the output picture divided by the horizontal width of the decoded video, and the first vertical scaling factor is equal to the vertical height of the output picture divided by the vertical height of the decoded video.*

*30. The video decoding method as specified in claim 29, wherein the second scaling factor comprises a second horizontal scaling factor and a second vertical scaling factor while the sub-picture aspect ratio includes a horizontal ratio and a vertical ratio, in which the second horizontal scaling factor is equal to the first horizontal scaling factor divided by the horizontal ratio of the sub-picture aspect ratio, and the second vertical scaling factor is equal to the first vertical scaling factor divided by the vertical ratio of the sub-picture aspect ratio.*

*31. The video decoding method as specified in claim 29, wherein the horizontal width of the output picture is the product of the horizontal width of the active display area of the video output device and a horizontal ratio of a video aspect ratio, and the vertical height of the output picture is the product of the vertical height of the active display area of the video output device and a vertical ratio of the video aspect ratio.*

*32. The video decoding method as specified in claim 28, wherein if the decoded sub-picture is for the purpose of visual effect, the displayed size of the decoded sub-picture is set according to the first scaling factor when combining the decoded video and the decoded sub-picture.*

*33. The video decoding method as specified in claim 28, wherein the decoded sub-picture is prevented from exceeding the border of the output picture and covering the main region of the decoded video when combining the decoded video and the decoded sub-picture.*

*34. The video decoding method as specified in claim 28, wherein when the decoding of the sub-picture bit stream generates a plurality of decoded sub-pictures, overlay among the plurality of decoded sub-pictures is prevented when combining the decoded video and the decoded sub-pictures.*

*35. A video decoding apparatus capable of controlling presentation of sub-pictures, which is for decoding a digital audio/video signal and outputting an output picture through a video output device, wherein the digital audio/video signal includes a video bit stream and a sub-picture bit stream, the video decoding apparatus comprising:*

*a first decoder which receives the video bit stream and decodes the video bit stream to generate a decoded video;*

*a second decoder which receives the sub-picture bit stream and decodes the sub-picture bit stream to generate at least one decoded sub-picture;*

*a first scaler which generates a first scaling factor for scaling the decoded video;*

*a second scaler which generates a second scaling factor for scaling the decoded sub-picture, wherein the generation of the second scaling factor comprises determining the second scaling factor at least via a calculation that uses the first scaling factor; and*

*a combiner which sets a displayed size of the decoded video according to the first scaling factor, sets a displayed size and a position of the decoded sub-picture according to the second scaling factor, combines the decoded video and the decoded sub-picture, and outputs the combined picture to the video output device.*

*36. The video decoding apparatus as specified in claim 21, wherein the combiner sets the displayed size and the position of the decoded sub-picture further according to a relative position relationship between at least two of the decoded video and the at least one decoded sub-picture.*

*37. The video decoding method as specified in claim 28, wherein in the step of setting the displayed size and the position of the decoded sub-picture according to the second scaling factor, the displayed size and the position of the at least one decoded sub-picture are set further according to a relative position relationship between at least two of the decoded video and the at least one decoded sub-picture.*

* * * * *